United States Patent [19]

Kummer et al.

[11] 4,198,183
[45] Apr. 15, 1980

[54] MOTION TRANSLATION APPARATUS

[76] Inventors: Kenneth L. Kummer, 105 E. Foster, Roselle, Ill. 60172; Heinz O. Kramer, 215 S. Bloomingdale Rd., Bloomingdale, Ill. 60108; Stephan Weyeneth, Rehbuehlstrasse 29, 8610 Uster, Switzerland; Claus Kowitz, Uhlandstrasse 1, Bad-Ditzenbach, Fed. Rep. of Germany

[21] Appl. No.: 956,592

[22] Filed: Nov. 1, 1978

[51] Int. Cl.² .......................... B23C 1/14; B23Q 1/18
[52] U.S. Cl. ...................................... 409/132; 51/231; 74/104; 409/145; 409/158; 409/162
[58] Field of Search ............... 409/131, 132, 145, 158, 409/159, 161, 162, 167, 173; 74/103, 104; 269/56; 51/231

[56] References Cited

U.S. PATENT DOCUMENTS

| 2,417,729 | 3/1947 | Bazley | 409/162 X |
| 3,039,163 | 6/1962 | Elliott | 409/173 X |
| 3,094,816 | 6/1963 | Dreier | 74/103 X |
| 3,892,137 | 7/1975 | Menzel | 74/103 X |
| 3,974,553 | 8/1976 | Reiger, Jr. et al. | 409/158 X |

Primary Examiner—William R. Briggs
Attorney, Agent, or Firm—Dressler, Goldsmith, Clement, Gordon & Shore, Ltd.

[57] ABSTRACT

A motion translation apparatus and method is provided which is particularly suitable for use with machine tools wherein the workpiece is moved relative to a tool. A stationary guideway member having a track of ball bearings mounted partially projecting from a V-shaped channel is fixed relative to the tool and relative to a rotatably driven turntable on which a hydraulic fluid operated actuator is pivotably mounted at one end. The piston of the actuator is pivotably secured to a link member which is in turn pivotably mounted on one end to the turntable. The free end of the link member opposite the end pivotably mounted to the turntable is pivotably connected to a movable guideway member which has a V-shaped channel adapted to receive and engage projecting portions of the ball bearings in the stationary guideway member for a predetermined arc of rotation of the turntable. The movable guideway member is moved against the stationary guideway member as the piston is moved outwardly for the predetermined arc of rotation of the turntable. The movable guideway member further has means for fixedly holding the workpiece to be machined. As the turntable rotates, the movable guideway member carries the workpiece through a path parallel to the track defined by the stationary guideway member and the workpiece is contacted and machined by the tool.

15 Claims, 3 Drawing Figures

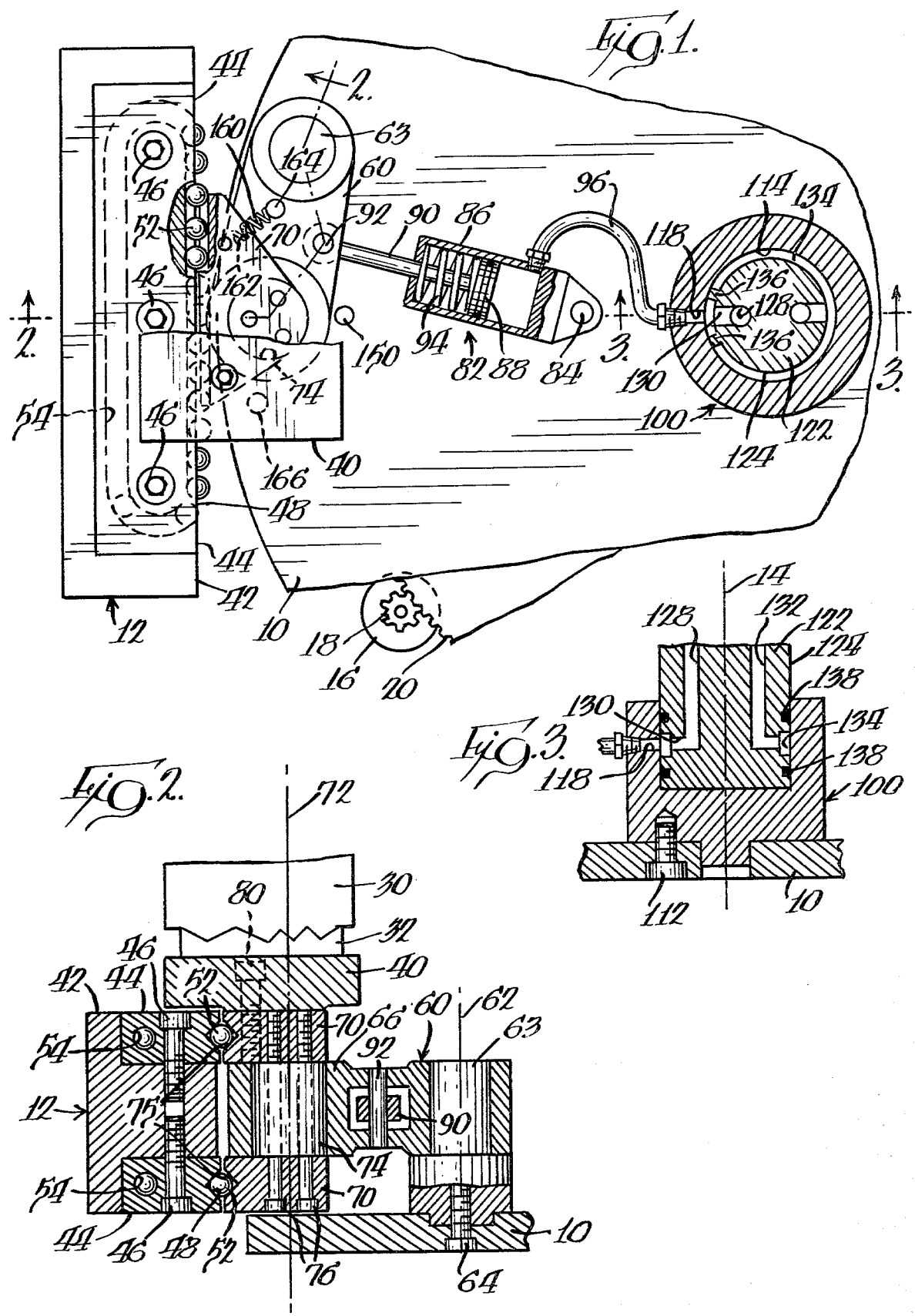

MOTION TRANSLATION APPARATUS

BACKGROUND OF THE INVENTION

This invention relates to a method for translating rotary motion to non-rotary motion, such as linear motion, and to apparatus for operating in accordance with the method. The invention is particularly well suited to applications in the machine tool art wherein a workpiece is carried on a rotating member for feeding past a tool element. In particular, the method and apparatus of the present invention are believed to provide great benefits when used with surface grinding machines, profile grinding machines, milling machines and the like to obtain a "through-feed" system of operation.

With respect to translating circular or rotary movement to non-circular or linear movement, it is known to use a fixed track or guideway for receiving and guiding a moving member. However, with many types of prior art systems, the complexity of the structure and of the range of motions of various members comprising the structure, make it very difficult to provide an apparatus with a high degree of dynamic rigidity. Consequently, many of these prior art machines operate with more than the desired amount of vibration, more than the desired amount of deviation from the intended feed path, and more than the desired probability of failure.

With machine tools, it is especially desired to provide methods and structures which maintain the workpiece and the tool, when in contact, with a minimum of structural flexing or vibration so that accurate tooling operations can be performed.

It would be especially desirable to provide a method and an apparatus for utilizing common rotary motion and for translating that rotary motion to a non-rotary or linear motion for feeding a workpiece against a tool with a high degree of dynamic rigidity and with no, or insignificant, vibration.

SUMMARY OF THE INVENTION

According to the preferred form of the method of the present invention, a workpiece is mounted on a movable guideway member. The movable guideway member is moved in a generally circular locus or orbit, as by being carried on a rotatable turntable, and is adapted for being simultaneously moved radially outward perpendicular to the axis of the orbit. The stationary guideway member and machine tool is located adjacent the generally circular locus of travel of the movable guideway member. Then, as the movable guideway member travels through the circular locus and adjacent the stationary guideway, it is moved radially outwardly and into contact with the staionary guideway member. The movable guideway member is also adapted to change orientaion or rotate slightly in its path of travel. Thus, as the movable guideway member contacts the stationary guideway, the movable guideway member is forced against the stationary guideway member and is also oriented within its path of travel to remain in proper contact with the stationary guideway for a predetermined arc of rotation so that the workpiece carried by the movable guideway member contacts, and is machined by, the tool along a non-circular path, such as a straight line path.

In the preferred form of the apparatus of the present invention, a circular turntable is provided which is rotatable about a first axis. A drive means, such as a motor, is used to drive the turntable about the first axis. A stationary guideway member and tool element are positioned adjacent the circular turntable in fixed relation to the turntable. The stationary guideway member has one or more V-shaped guide channels with a plurality of partially projecting ball bearings in the channel which define a predetermined non-circular locus, such as a straight-line or linear path.

A link member is pivotably mounted towards one end about a second axis in the circular turntable. The link member is thus carried by the turntable when the turntable rotates. The link member has a free end opposite the pivotably mounted end which is movable between an inwardly pivoted retracted position and a range of outwardly pivoted extended positions.

On the link member, towards its free end, a movable guideway member is pivotably mounted about a third axis and has one or more V-shaped channels adapted to receive and engage the projecting portions of the ball bearings in the stationary guideway member for a predetermined arc of rotation of the circular turntable. The movable guideway, being pivotably mounted to the link member, is adapted to pivot about the third axis to maintain the V-shaped channels of the movable guideway member parallel to the non-circular locus defined by the V-shaped channels and ball bearings in the stationary guideway member. A holding member is provided on the movable guideway member for holding the workpiece to be machined as it is moved past the tool.

The hydraulic fluid-operated actuator is mounted on the turntable and is connected to the link member for moving the free end of the link radially outward when the turntable rotates the link (and the movable guideway member carried thereon), adjacent the stationary guideway member. By properly controlling the operation of the hydraulic cylinder, the movable guideway member can be brought into contact with the stationary guideway member and engaged with the stationary guideway member along the linear path defined by the V-shaped channel in the stationary guideway member for a predetermined arc of rotation of the turntable.

With such a method and apparatus for translating rotational movement to linear movement, it is predicted that a high degree of dynamic rigidity can be achieved. Specifically, such a structure could handle up to 50 kilopounds of force per micron of maximum deflection. The maximum deviation from the optimal or design straight line path would be about 2 microns over a linear path length of 100 millimeters.

Thus, it is seen that the combined effect of the various elements associated in accordance with the present invention is not merely equal to the sum of the several effects of those elements alone. Rather, the novel method and combination of structural elements in accordance with the present invention yields a desirable and synergistic result—a result which is a substantial improvement over the prior art.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a simplified, fragmentary, partial cross-sectional plan view of the apparatus of the present invention;

FIG. 2 is a cross-sectional view taken generally along the plane 2—2 of FIG. 1; and FIG. 3 is a cross-sectional view taken generally along the plane 3—3 of FIG. 1.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with only reference to an embodiment which is simple and straightforward.

For ease of description, the apparatus of this invention will be described in a normal operation position, and terms such as upper, lower, horizontal, etc., will be used with reference to this normal operating position. It will be understood, however, that the apparatus of this invention may be manufactured, stored, transported and sold in an orientation other than the normal operating position described.

The apparatus of this invention has certain conventional drive mechanisms and control mechanisms the details of which, though not fully illustrated or described, will be apparent to those having skill in the art and an understanding of the necessary functions of such drive mechanisms.

The apparatus of the present invention is illustrated, in simplified form, in FIG. 1 and comprises (1) a rotating portion which includes a turntable 10 and (2) a stationary portion which includes the stationary guideway means or member 12. The turntable 10 functions as a carriage and supports a number of other components as will be explained in more detail hereinafter.

The turntable 10 is rotatable about a first vertical axis (designated 14 in FIG. 3) and may be driven or rotated about the first axis by a suitable means such as a motor 16 and drive gear 18 which engages a large driven gear 20 secured to the turntable 10. Any appropriate means for rotating the turntable about axis 14 may be used. For example, a motor may be directly connected to the turntable at axis 14 or the motor may drive the periphery of the turntable 10.

Before describing in detail the structure of the turntable and components thereon, it will be helpful to describe in broad terms how a workpiece is machined with this apparatus. As shown in FIG. 2, a tool 30, such as grinding or cutting wheel, is maintained, by means not shown, in fixed relation to the turntable 10. A workpiece 32, which is to be machined, is fixedly secured, by suitable clamping arrangement not illustrated, to a workpiece holding means 40 which is mounted, by means of other elements to be described hereinafter, to, and carried by, the turntable 10. When the turntable 10 rotates (into or out of the plane of FIG. 2) the workpiece 32 is carried past the tool 30 whereupon machining of the workpiece 32 is effected. The tool 30 and the workpiece 32 are not illustrated in FIG. 1 so as to provide a more clear illustration of the other parts of the apparatus which lie directly below the tool 30 and workpiece 32.

With the overall description of the apparatus in mind, the various components comprising the apparatus of the present invention will now be described in detail. As best illustrated in FIGS. 1 and 2, the stationary guideway means or member 12 includes a support block 42 and a pair of linear guideway blocks 44. The support block 42 is substantially T-shaped in cross section and receives the linear guideway blocks 44 on either side. The blocks 44 are preferably secured to the support block 42 by means of bolts 46.

Each linear guideway block 44 defines a guide track 48, along the side facing the turntable 10, which has the form of a V-shaped channel in which are mounted a plurality of partially projecting ball bearings 52. The ball bearings are secured together by a suitable ball bearing retaining structure (not illustrated). Near each end of the linear guideway blocks 44 the ball bearings 52 are received in a bore 54 as best illustrated in FIG. 2. The bore 54 forms a continuous loop with the V-shaped portion of the guide track 48 as best illustrated in FIG. 1. The ball bearings 52 and their retaining structure are thus free to travel through the guide track 48 and bore 54 as may be necessary.

Near the periphery of the turntable 10 is a link member 60 which is pivotably mounted towards one end thereof about a second axis (designated 62 in FIG. 2) to the turntable 10 by means of a stepped-diameter pin 63 which is secured to the turntable 10 by means of screw 64. The link member 60 is carried by, and is thus rotatable with, the turntable 10.

Opposite pin 63 the link member 60 has a free end 66 which is movable between an inwardly pivoted retracted position and a range of outwardly pivoted extended positions. A pair of movable guideway members 70 are mounted, one on each side of the link member 60, for pivotable movement about a third axis 72 with respect to the link member 60. Specifically, an internal bearing post 74 is journaled within the free end 66 of link 60 and each movable guideway member 70 is secured in fixed relation to each other with bolts or screws 76 through bearing post 74.

Each movable guideway member 70 defines, on its side facing outwardly from the first longitudinal axis 14 of the turntable 10, a generaly V-shaped channel 75 adapted to receive and engage the projecting portions of the ball bearings 52 in the stationary guideway member 12. Thus, when the movable guideway members 70 are carried by turntable 10 adjacent the stationary guideway member 12, the movable guideway members 70 will pivot as necessary on bearing post 74, relative to the free end 66 of link member 60, to maintain the V-shaped channels 75 parallel to the V-shaped guide tracks 48 of the stationary guideway member 12.

As best illustrated in FIGS. 1 and 2, the workpiece holding means 40 is mounted on and secured to one of the movable guideway members 70 as by screw 80. Alternatively, the workpiece holding means 40 may be an integral extension of one of the movable guideway members 70. In any case, the workpiece holding means 40 pivots and rotates with the movable guideway members 70 and thus carries the workpiece 32 through the path defined by the interaction between the movable guideway member 70 and the stationary guideway member 12.

In order to carry the workpiece 32 past the tool 30 along a non-circular or linear path defined by the stationary guideway member 12, the movable guideway members 70 must be forced radially outwardly against, and into contact with, the stationary guideway member 12 for some pedetermined arc of rotation of the turntable. To this end, a novel means for pivoting the link member 60 outwardly with respect to the turntable is provided.

The actuator means 82, such as a hydraulic fluid-operated cylinder and piston actuator, is mounted to the turntable 10 at one end about a pivot pin 84. The hydraulic fluid-operated cylinder and piston actuator 82 comprises a cylinder 86 and a piston 88. A piston rod 90 extends out of the cylinder 86 and is pivotably connected to the link member 60 about pin 92. The piston 88 is spring biased within the cylinder 86 by spring 94 to urge the piston rod 90 radially inward, relative to turntable 10, towards the first axis 14 about which turntable 10 rotates. The piston 88 is moved outwardly by pressurized hydraulic fluid which is selectively forced into the cylinder 86 through conduit 96. The hydraulic fluid, when forced into hydraulic cylinder 86, overcomes the biasing force of spring 94 and moves the piston rod 90 ouwardly to urge the link 60 and the attached movable guideway member 70 outwardly against the linear guideway blocks 44 of stationary guideway member 12.

The novel structure is provided to simply but effectively pressurize the cylinder actuator 82 with hydraulic fluid at the appropriate point during the rotation of turntable 10. Specifically, as best illustrated in FIGS. 1 and 3, the turntable 10 is provided with a central hydraulic distribution housing 100 which may be integral therewith or secured thereto, as by bolts or screws 112. The housing 100 is mounted for rotation with the turntable 10 and is coaxially aligned with the first axis 14 of the turntable 10. The distribution housing 100 has an interior cylindrical surface 114 as best illustrated in FIG. 1. The distribution housing 100 further defines therein a hydraulic fluid bore 118 communicating between the exterior and interior of the distribution housing to which conduit 96 of the hydraulic fluid-operated cylinder and piston actuator 82 is connected to allow passing of fluid between the interior of the distribution housing 100 and the cylinder 86.

Mounted in the distribution housing 100 is a hydraulic fluid supply shaft 122 which has a cylindrical outer surface 124. Shaft 122 is mounted within the distribution housing 100 coaxially with the first axis 14 of the turntable 10 and is fixed against rotation relative to both the distribution housing 100 and turntable 10. With reference to FIG. 3, the hydraulic fluid supply shaft 122 is prevented from rotating relative to the distribution housing 100 by suitable connection or support not illustrated.

The hydraulic fluid supply shaft 122 has a hydraulic fluid shaft supply conduit 128 and a hydraulic fluid shaft supply chamber 130 communicating between the shaft supply conduit 128 and the cylindrical outer surface 124 of the shaft. The hydraulic fluid shaft supply chamber 130 is a channel which extends for a portion of the circumference around shaft 122. The shaft 122 further has a hydraulic shaft return conduit 132 and a hydraulic fluid shaft return chamber 134 communicating between the shaft return conduit 132 and the cylindrical outer surface 124 of the shaft 122. The hydraulic fluid shaft return chamber 134 is a channel which extends around the shaft 122 for a portion of its circumference. As best shown in FIG. 1, the supply chamber 130 and the return chamber 134 are separated at two points by interposed portions 136 of the shaft 122. Further, the chambers 130 and 134 are sealed against out-leakage relative to the shaft 122 and surrounding distribution housing 100 by means of suitable sealing rings or gaskets 138.

Since the shaft 122 is maintained fixed relative to turntable 10, the distribution housing 100 rotates around the shaft 122 as the turntable 10 rotates. With reference to FIG. 1, as the distribution housing 100 rotates, the hydraulic fluid bore 118 in the distribution housing 100 is cyclically rotated into communication with the supply chamber 130 and then the return chamber 134. Preferably, a constant hydraulic pressure is maintained in the hydraulic fluid shaft supply conduit 128 so that whenever bore 118 is rotated into communication with supply chamber 130, the hydraulic fluid-operated cylinder piston and actuator 82 will be pressurized or actuated to move the movable guideway members 70 outwardly. By the same token, upon further rotation of the turntable 10, the hydraulic fluid bore of the distribution housing 100 is brought into communication with the return chamber 134 so that the pressurized hydraulic fluid in the cylinder 86, under the influence of the spring 94, is forced out of the cylinder 86 and is discharged from the apparatus through the hydraulic fluid shaft return conduit 134. An appropriate reservoir and pump system may be provided and connected with the supply and return conduits 128 and 132 as necessary to provide this operation. Such a hydraulic pump and reservoir system is well known and these are not illustrated or further described.

In operation, the apparatus operates according to the novel method of the present invention as follows: First, a tool, such as tool 30, is located in a fixed position relative to the apparatus as illustrated in FIG. 2. Next, a workpiece is secured to one of the movable guideway members 70, as at the workpiece holding means 40 illustrated in FIG. 2. The stationary guideway member 12 is provided adjacent the turntable 10 at a proper distance with respect to the periphery of the turntable 10. The stationary guideway member 12 has a specific predetermined guide track (in the illustrated embodiment, a linear track 48) which defines a predetermined non-circular locus. Next, the turntable 10 is rotated about the axis 14. As the turntable rotates, the distribution housing 100 rotates therewith and, when the movable guideway members 70 have been rotated through a circular orbit about the first axis 14 to a point near the stationary guideway member 12, the bore 118 in the distribution housing is brought into communication with the hydraulic fluid supply chamber 130 so that the actuator 82 is pressurized thereby moving the movable guideway members 70 radially outward relative to the turntable axis 14 and forcing the movable guideway members 70 against the stationary guideway member 12. As this occurs, owing to the pivot mounting of the movable guideway members 70 on link member 60, the movable guideway members 70 pivot relative to the turntable as well as to the link member 60 while in contact with the stationary guideway member 12 to maintain the engaging surfaces of the guideway members parallel through a predetermined arc of rotation whereby the workpiece 32 contacts, and is machined by, the tool 30. After the turntable has rotated through a sufficient arc such that the movable guideway members 70 have been carried past and out of engagement with the stationary guideway member 12, the bore 118 in the distribution housing 100 has been also rotated so that it is in communication with the hydraulic fluid return chamber 134 whereupon the hydraulic fluid, under the influence of the actuator spring 94, is discharged from the cylinder 86.

The arc of rotation of the turntable 10 in which the movable guideway members are urged radially outwardly by the actuator 82 is determined, in part, by the relative circumferential lengths of the chambers 130 and 134 in shaft 122. By making the supply chamber 130 larger (circumferentially in shaft 122) with respect to the return chamber 134, the angle of turntable rotation through which the movable guideway members 70 are moved radially outwardly against the stationary guideway member 12 increases.

Though in the illustrated embodiment the stationary guideway member 12 is shown as having a straight or linear guide track 48, it is to be realized that the guide track may be non-linear. Many types of predetermined loci may be defined by appropriate design of the stationary and movable guideway members.

Instead of using the ball guideways 52 illustrated, it is possible to use hydrostatic guideways. Further, instead of using a hydraulic actuator 82 as illustrated, the outward radial movement of the link member 60 could be achieved with a mechanical actuator of suitable design such as a structure incorporating a template or camming surface.

In order to prevent the link member 60 from being pulled radially inwardly an undue amount when the hydraulic fluid is discharged from the actuator 82, a suitable stop pin 150 may be provided to contact one end of the link member 60 as illustrated in FIG. 1. This will ensure that as the turntable 10 undergoes another rotation, the movable guideway members 70 will not be accidentally rotated an undue amount about the bearing post 74 which could prevent re-alignment of the movable guideway members 70 with the stationary guideway member 12 during the next revolution of the turntable 10.

To ensure that the movable guideway members 70 will be in general alignment with the stationary guideway member 12 after each rotation of turntable 10, a cooperating biasing and stop structure may be provided. Specifically, with reference to FIG. 1, a spring 160 is partially disposed within a receiving bore 162 in the upper movable guideway member 70. A spring retainer pin 164 is mounted on the link member 60 and projects upwardly therefrom for abutting the distal end of the spring 160 whereby the spring 160 is retained in compressive engagement between the pin 164 and the upper movable guideway member 70. Thus, when the movable guideway members 70 are out of contact with stationary guideway member 12, spring 160 will tend to rotate the guideway members 70 counterclockwise about bearing post 74 as viewed in FIG. 1.

To avoid over-rotation of the movable guideway members 70 about the bearing post 74, stop pin 166 is mountedon the turntable 10 and projects outwardly therefrom. The stop pin 166 is adapted to contact the lower movable guideway member 70 as the movable guideway members 70 rotate to a certain point about bearing post 74 in a counterclockwise direction as viewed in FIG. 1. Thus, when the turntable 10 has carried the movable guideway members 70 out of contact with the staionary guideway member 12, the movable guideway members 70 are urged by spring 160 to contact pin 166 at a predetermined, angled orientation with respect to the turntable 10, which angle is substantially the desired angle of initial alignment between the movable guideway members 70 and the stationary guideway member 12 at the point where the movable guideway members 70 first contact the stationary guideway member 12 during each revolution of the turntable 10. As the movable guideway members 70 are carried past the point of initial contact with the stationary guideway member 12 by the revolving turntable 10, the movable guideway members 70 are necessarily forced to rotate clockwise about the bearing post 74 (as viewed in FIG. 1) so that the movable guideway members 70 move out of contact with, and away from, the stop pin 166, thereby compressing spring 160.

Although in the preferred embodiment only one tool 30 and workpiece 32 are illustrated, it is to be realized that the method and apparatus of the present invention are suitable for use with multiple tools or tool stations and with multiple workpieces. A number of variations are possible. For example, a number of tools could be located in vertical alignment and a number of workpieces could be mounted in vertical alignment on one workpiece holding means, such as workpiece holding means 40, so that the plurality of workpieces can be machined at one time. In another embodiment, it would be possible to provide a plurality of associated movable guideway members, a plurality of link members, and a plurality of cylinder and piston actuators identical to those illustrated for the preferred embodiment in FIG. 1 but with all of these guideway members, link members, and actuators being spaced around the turntable and with each actuator connected by a conduit, such as conduit 96, to the single hydraulic fluid distribution housing, such as housing 100, whereby each movable guideway member would be forced seriatim against a single stationary guideway member.

In a typical embodiment of the apparatus of the present invention, it is contemplated that the diameter of the turntable would be about 600 millimeters. With this diameter, it would be convenient to mount between 8 to 12 actuators, link members, and movable guideway members, spaced at equal intervals about the turntable for handling small workpieces.

In another embodiment, it would be possible to provide a number of tool stations around the periphery of the single turntable. By providing a plurality of associated pairs of supply and return hydraulic fluid conduits within a single shaft (such as shaft 122) and by providing a plurality of associated supply and return chambers within the shaft, the workpiece could be sequentially moved into contact with, and machined by, each tool as it rotates through a single revolution with the turntable.

With the present invention, it is realized that a uniform angular velocity of the turntable produces a non-uniform velocity of the workpiece past the tool. The workpiece, if driven past the tool in a linear path, will move more sowly at the ends of the linear path and will move faster in the middle. In most cases, this effect can be ignored because the arc of turntable rotation in which the workpiece contacts the tool is relatively small. However, where this effect is unacceptable, the angular velocity of the turntable could be varied by suitable control means to produce a uniform velocity of the workpiece past the tool.

Other variations of the above-described embodiments, including combinations of some of the above-described embodiments, are possible.

From the foregoing, it will be observed that numerous variations and modifications may be effected without departing from the true spirit and scope of the novel concept of the invention. It is to be understood that no limitations with respect to the specific apparatus and method illustrated and described herein is intended or should be inferred. It is, of course, intended to cover by the appended claims all such modifications as fall within the scope of the claims.

We claim:

1. In a machine tool, a motion translation apparatus comprising:
   turntable means rotatable about a first axis;
   means for rotating said turntable means about said first axis;
   stationary guideway means for defining a non-circular locus and positioned close to said turntable means;
   a link member pivotably mounted towards one end thereon about a second axis in said turntable means, said link member being rotatable with said turntable means and having a free end opposite said pivotably mounted end which is movable between a retracted position and a range of extended positions;
   a movable guideway member pivotably mounted about a third axis to said link member towards its free end and adapted to have a surface thereof engage a surface of said stationary guideway means during a predetermined arc of rotation of said turntable means and to pivot about said third axis to maintain said engaging surface parallel to said engaged surface of said stationary guideway means;
   means mounted on said movable guideway member for holding said workpiece; and
   means for moving the free end of said link member with respect to said turntable means towards said stationary guideway means in said extended range of positions whereby, when said turntable means is rotated through said predetermined arc, said free end of said link member forces said movable guideway member against said stationary guideway means and along said predetermined non-circular locus and pivots said movable guideway member to maintain its engaging surface parallel to the engaged surface of said stationary guideway means.

2. The apparatus in accordance with claim 1 in which said stationary guideway means is spaced from said turntable means first axis.

3. The apparatus in accordance with claim 1 further including a cutting tool fixedly secured relative to said stationary guideway means, said cutting tool adapted to machine said workpiece.

4. The apparatus in accordance with claim 1 in which said movable guideway member and said means mounted on said movable guideway member for holding said workpiece are integral.

5. The apparatus in accordance with claim 1 in which said first, second, and third axes are mutually parallel.

6. The apparatus in accordance with claim 1 in which said stationary guideway means and said movable guideway member each include a guide track therein.

7. The apparatus in accordance with claim 6 in which said stationary guideway means guide track includes projecting, linear ball bearings.

8. The apparatus in accordance with claim 1 in which said movable guideway member defines a V-shaped guide channel and in which said stationary guideway means further includes a plurality of partially projecting ball bearings along said locus for engaging said V-shaped channel of said movable guideway member.

9. The apparatus in accordance with claim 1 in which said means for pivoting said link member includes actuator means connected between said link member and said turntable means.

10. The apparatus in accordance with claim 9 in which said actuator means is a hydraulic fluid operated cylinder and piston actuator with the head of said piston received in said cylinder, with the rod of said piston pivotably secured to said link member, and with the cylinder pivotably mounted to said turntable means.

11. The apparatus in accordance with claim 10 further including spring means for biasing the head of said piston into said cylinder.

12. The apparatus in accordance with claim 11 in which:
   said turntable means further includes a hydraulic fluid distribution housing mounted for rotation therewith and coaxially aligned with said turntable means first axis; said hydraulic fluid distribution housing having an interior cylindrical surface and a hydraulic fluid bore communicating between said interior cylindrical surface and the exterior of the housing; and in which
   said turntable means further includes a hydraulic fluid supply shaft having a cylindrical outer surface, said shaft being mounted within said hydraulic fluid distribution housing coaxially with said turntable means first axis and fixed against rotation relative to said hydraulic fluid distribution housing and turntable means, said shaft having a hydraulic fluid shaft supply conduit and a hydraulic fluid shaft supply chamber communicating between said shaft supply conduit and said cylindrical outer surface; said shaft further having a hydraulic fluid shaft return conduit and a hydraulic fluid shaft return chamber communicating between said shaft return conduit and said cylindrical outer surface; and in which
   said turntable means further includes a hydraulic fluid conduit connecting said hydraulic fluid bore of said distribution housing with said cylinder and piston actuator,
   whereby rotation of said turntable means causes rotation of said hydraulic fluid distribution housing bringing the hydraulic fluid bore of said housing into communication with said shaft supply chamber and allowing hydraulic fluid to pass from said shaft supply chamber through said hydraulic fluid distribution housing bore and through said conduit to said cylinder and piston actuator to move said piston within said cylinder to exert an outward radial force on said link member to move said free end and whereby continued rotation of said turntable means positions said hydraulic fluid distribution housing fluid bore in communication with said hydraulic fluid shaft return chamber allowing hydraulic fluid to be discharged from said cylinder and piston actuator and relieving said outward radial force.

13. In a machine tool having a tool element for machining a workpiece brought into contact therewith, the improvement of a motion translation apparatus for using a rotary drive to move the workpiece through a predetermined non-circular locus against the tool element, said apparatus comprising:
   a circular turntable rotatable about a first axis;

a rotatable drive means for rotating said circular turntable about said first axis;

a stationary guideway member positioned to close to said circular turntable member in fixed relation to said tool element and further having at least one V-shaped guide channel and a plurality of partially projecting ball bearings in said channel defining a predetermined non-circular locus;

a link member pivotably mounted towards one end thereof about a second axis in said circular turntable, said link member being rotatable with said turntable and having a free end opposite said pivotally mounted end which is movable between an inwardly pivoted retracted position and a range of outwardly pivoted extended positions;

a movable guideway member pivotably mounted about a third axis to said link member towards its free end, said movable guideway member having a V-shaped channel adapted to receive and engage the projecting portions of said ball bearings in said stationary guideway member for a predetermined arc of rotation of said circular turntable and adapted to pivot about said third axis to maintain the V-shaped channel of the movable guideway member parallel to said predetermined non-circular locus defined by said stationary guideway member;

means on said movable guideway member for fixedly holding the workpiece to be machined;

a hydraulic fluid operated actuator for moving the free end of said link member about said second axis, said actuator having a cylinder pivotably mounted to said circular turntable and a piston in said cylinder, said piston having a head slidably disposed within said cylinder and a rod extending from said cylinder and pivotably secured to said link member, said actuator further including a spring means for biasing said piston inwardly into said cylinder to withdraw the piston rod therein; and means for supplying hydraulic fluid to said actuator for at least a predetermined angle of rotation of said circular turntable whereby said piston is moved outwardly to move said free end of said link member forcing said movable guideway member against said stationary guideway member and along said predetermined non-circular locus thereby causing said movable guideway member to pivot to maintain its V-shaped channel parallel to said predetermined non-circular locus of said stationary guideway member when machining said workpiece.

14. A motion translation apparatus comprising:

a carriage rotatable about an axis;

means for rotating said carriage;

stationary guideway means for defining a non-circular locus and positioned adjacent said carriage;

a link member pivotably mounted to said carriage, rotatable therewith and movable between a retracted position and a range of extended positions;

a movable guideway member pivotably mounted to said link member and adapted to have a surface thereof engage a surface of said stationary guideway means during a predetermined arc of rotation of said carriage and adapted to pivot to maintain said engaging surface parallel to said engaged surface of said stationary guideway means; and means for pivoting said link member with respect to said carriage towards said stationary guideway means in said extended range of positions whereby, when said carriage is rotated through said predetermined arc, said link member forces said movable guideway member against said stationary guideway means and along said predetermined non-circular locus and pivots said movable guideway member to maintain its engaging surface parallel to the engaged surface of said stationary guideway means.

15. The method of moving a workpiece through a predetermined non-circular machining path comprising the steps of:

A. mounting a movable guideway member on a rotatable carriage for circular movement therewith, for simultaneous radial movement perpendicular to the axis of rotation of the carriage and for simultaneous pivotable movement with respect to said carriage;

B. fixedly securing the workpiece to said movable guideway member;

C. providing a stationary guideway adjacent said carriage and securing a machining tool to said stationary guideway;

D. rotating said carriage about its axis through a predetermined arc;

E. moving said guideway member radially relative to said carriage axis and forcing said movable guideway member against said stationary guideway;

F. pivoting said movable guideway member relative to said carriage while in contact with said stationary guideway as said movable guideway member is carried by said rotating carriage for said predetermined arc of rotation whereby said workpiece contacts and is machined by said machining tool; and G. thereafter removing said workpiece from said movable guideway member from a position beyond said predetermined arc.

* * * * *